May 5, 1953 E. L. KESSLER 2,637,500
HEATING AND VENTILATING SYSTEM, PARTICULARLY FOR VEHICLES
Filed Jan. 4, 1951 3 Sheets-Sheet 1
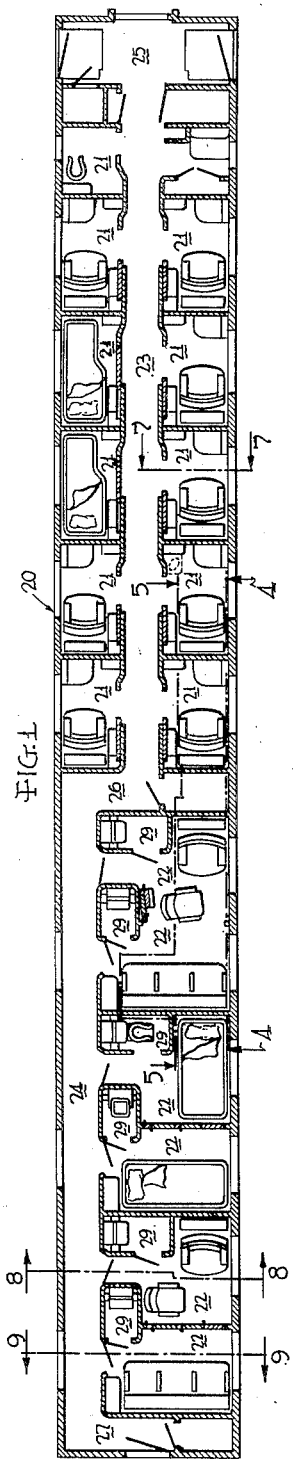
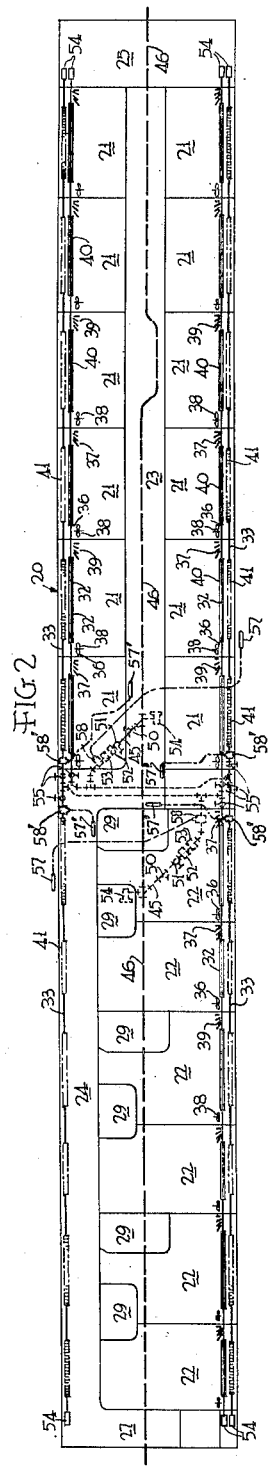
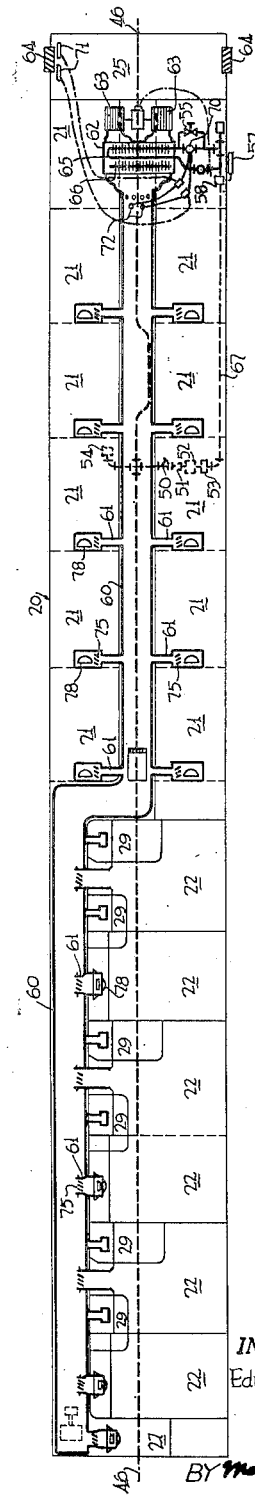
INVENTOR.
Edwin L. Kessler.
BY Maurice A. Creux
ATTORNEY May 5, 1953 E. L. KESSLER 2,637,500
HEATING AND VENTILATING SYSTEM, PARTICULARLY FOR VEHICLES
Filed Jan. 4, 1951 3 Sheets-Sheet 2
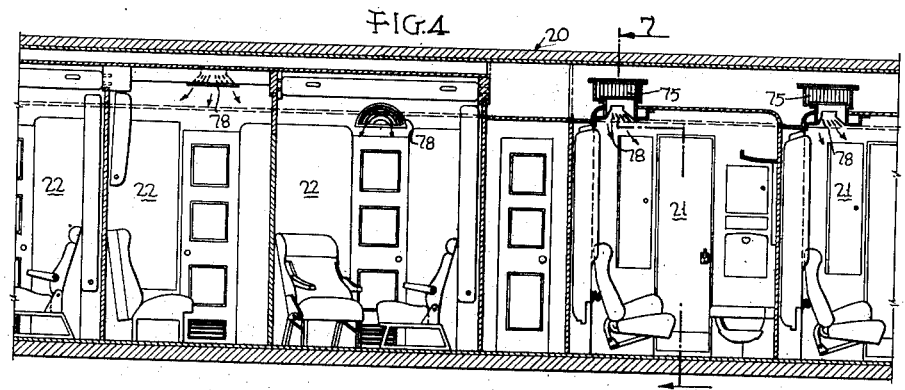
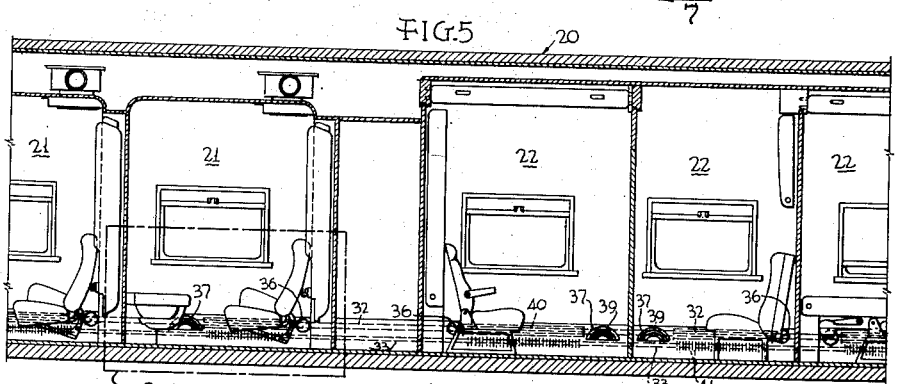
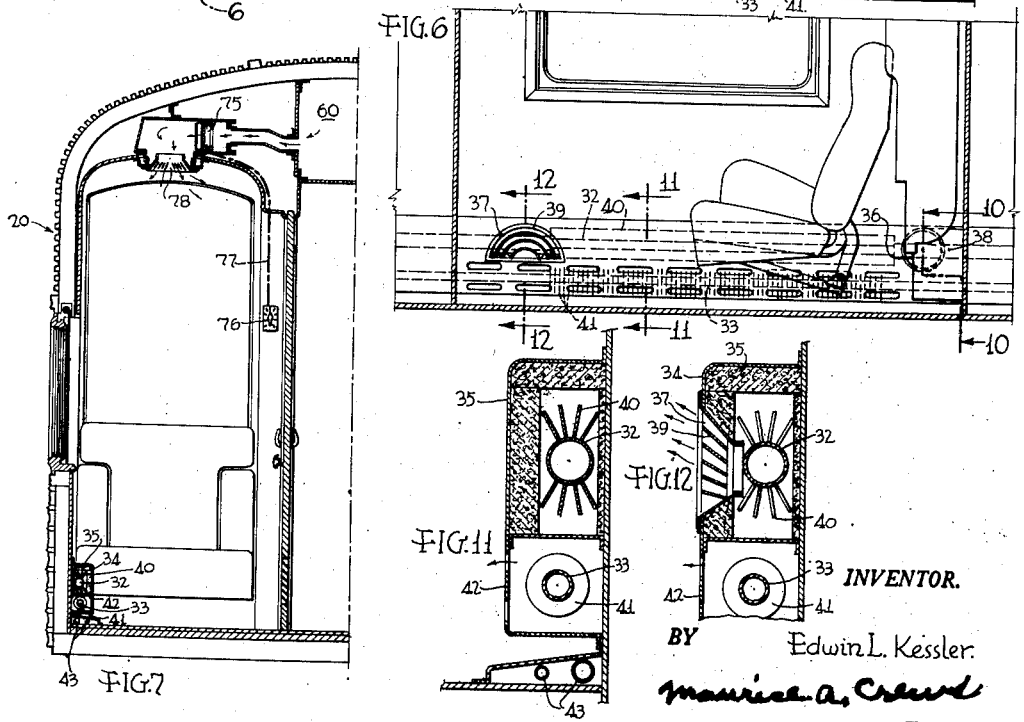
INVENTOR.
Edwin L. Kessler
BY
Maurice A. Crews
ATTORNEY May 5, 1953 E. L. KESSLER 2,637,500
HEATING AND VENTILATING SYSTEM, PARTICULARLY FOR VEHICLES
Filed Jan. 4, 1951 3 Sheets-Sheet 3

INVENTOR.
Edwin L. Kessler.
BY Maurice A. Crews
ATTORNEY

Patented May 5, 1953

2,637,500

UNITED STATES PATENT OFFICE 2,637,500

HEATING AND VENTILATING SYSTEM, PARTICULARLY FOR VEHICLES

Edwin L. Kessler, Philadelphia, Pa., assignor to The Budd Company, Philadelphia, Pa., a corporation of Pennsylvania Application January 4, 1951, Serial No. 204,314

7 Claims. (Cl. 237—5)

This invention relates to a heating and ventilating system, particularly for vehicles, and more particularly for railway cars, and has for an object the provision of improvements in this art.

One of the specific objects of the invention is to provide a heating system having great flexibility and a wide range of control, especially for compartment vehicles, whereby the maximum comfort temperature can be obtained at the passenger's selection, or a minimum comfort temperature can be obtained—again at the passenger's selection—as for cool sleeping conditions.

Another object is to provide a heating system which furnishes heat for a basic minimum comfort temperature to the entire vehicle without danger of overheating; and which supplies this basic heat continuously and without interruption as long as the heating medium or agent is available.

Another object is to provide a heating system which is divided and cross-connected so as to provide a marginal minimum for one side when a major heating means for that side is inoperative.

Another object is to provide a heating system which gives the occupant of a compartment selective control of both sidewall and overhead heat and over the reheating and recirculation of air or over the amount of fresh heated air admitted to the compartment.

Another object is to provide a heating system which includes improved means for reheating and recirculating air in the compartment whereby the occupant can quickly change the temperature of the compartment but without creating objectionable drafts, especially at the places or accommodations provided for the location of the occupant's body.

Another object is to provide a heating system which insures a minimum comfort temperature by the fresh air supplied when this air heat is added to the basic safetying sidewall heat supplied, the fresh air temperature being automatically raised as outside air temperatures drop.

Another object is to provide a heating system which uses only a single heating agent or medium, for example and preferably, steam from a train steam line. Water, however, may be used if the radiator surface areas are made to conform to the temperatures available. The water medium is especially suitable for self-propelled vehicles where the engine jacket cooling water is available for heating the vehicle.

The above and other objects and various advantages of the invention will be apparent from the following description of an exemplary embodiment, reference being made to the accompanying drawings, wherein:

Fig. 1 is a plan view of a compartmented rail car, such as a so-called 6-10 sleeper, showing the compartment lay-out;

Fig. 2 is a plan similar to Fig. 1 but omitting the furnishings of the compartments and showing the sidewall heating means;

Fig. 3 is a plan view of the same car as that shown in Fig. 1 but taken at a higher elevation and showing the overhead air heating and cooling means;

Fig. 4 is an enlarged vertical longitudinal section taken on the line 4—4 of Fig. 1;

Fig. 5 is an enlarged vertical longitudinal section taken on the line 5—5 of Fig. 1;

Fig. 6 is a further enlarged view of parts shown in the zone 6 of Fig. 5;

Fig. 7 is an enlarged vertical transverse section taken on the line 7—7 of Figs. 1 and 4;

Fig. 11 is an enlarged vertical transverse section taken on the line 11—11 of Fig. 6; and Fig. 12 is an enlarged vertical transverse section taken on the line 12—12 of Fig. 6.

Figure 8:
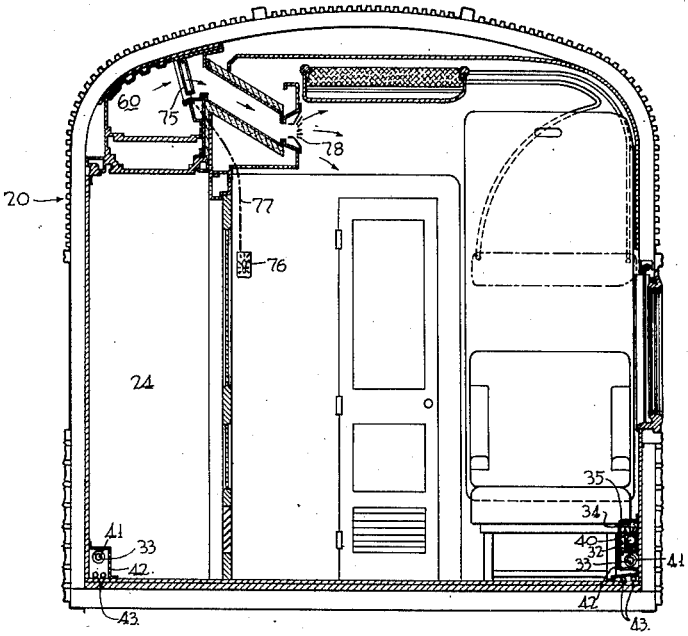
Fig. 8 is an enlarged vertical transverse section taken on the line 8—8 of Fig. 1.
Figure 9:
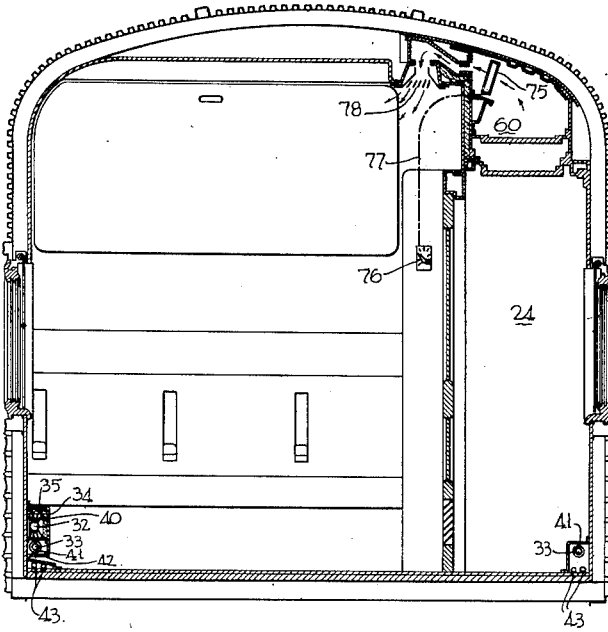
Fig. 9 is an enlarged vertical transverse section taken on the line 9—9 of Fig. 1.
Figure 10:
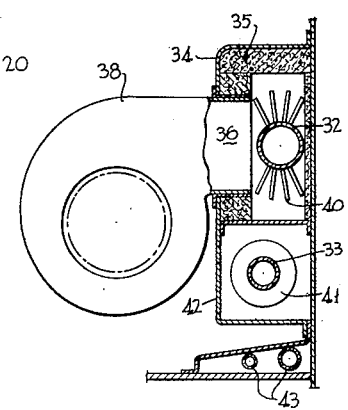
Fig. 10 is an enlarged vertical transverse section taken on the line 10—10 of Fig. 6.

Herein the heating system is shown as being applied to a railway compartment car, the particular car being what is known as a 6-10 sleeper, meaning a car having six bedrooms and a side aisle at one end and ten roomettes or cabins and a center aisle at the other end. The bedrooms may be arranged in pairs separated by a movable partition but inasmuch as they may be used for separate occupancy and have separate heating and control means, they will be treated as if the partitions were permanent.

In the drawings, the car as a whole is referred to by the numeral 20, the roomettes or cabins by 21, the bedrooms by 22, the center aisle between cabins by 23, and the side aisle alongside the bedrooms by 24. There is an end vestibule 25, a center connecting aisle 26 between 23 and 24, and a small end vestibule 27. Each bedroom is provided with a separately enclosed toilet 29.

The car is provided with sidewall heating means and overhead heating means. Herein the sidewall heating means comprises, for each side, a through-running primary or selective heating pipe 32 and a secondary or stand-by heating pipe 33.

The primary heating pipe 32, within each compartment, is preferably enclosed by a casing 34 which carries heat insulation 35 and has spaced openings 36 and 37. The opening 36 is shown to be located behind a seat and constitutes an air inlet served by a motor driven fan or blower 38; the opening 37 is an outlet which is located in front of the seat and is provided with a diffuser 39, such, for example, as one known as an "Anemostat," for spreading the heated air and mixing it with air from the compartment. The pipe 32 between the openings is provided with heat transfer fins 40, preferably copper and longitudinally directed relative to the pipe to avoid undue air turbulence. The fan is made to be quickly insertable and removable, requiring only to be placed and plugged in.

The stand-by heating pipe 33 is provided with transverse fins 41 and is disposed in a casing 42 having openings for air circulation. The heat produced from the pipe 33 is sufficient to prevent freezing, as of water pipes such as those shown at 43, in the car but does not create enough heat to cause a feeling of discomfort, even if its guard or casing is directly touched. If all other heat should be eliminated the pipe 33 would keep the space at a sub-comfort temperature and safety the car equipment. Normally it is not used alone for regular passenger service except at very low temperatures but is commonly used for stand-by heating.

The primary heating pipe 32 on one side of the car and the secondary heating pipe 33 on the other side of the car are connected together and served by a single supply pipe 45 receiving steam from the train steam line 46. The two pairs of primary-secondary pipes assure that some heat can be supplied to both sides even if one pair is disabled. The supply pipe 45 of each pair is provided with a strainer 50, a shut-off and drain valve 51, a pressure regulator 52 and a pressure relief valve 53. Suitable steam traps 54 are shown at the outer ends of the steam lines and at other desirable locations.

Along the aisle 24 the secondary heating pipe 33 alone is sufficient without a primary heating pipe 32 alongside. It is preferable to control each car end for each pipe separately and for this purpose a separate hand valve 55 is shown for each. In Fig. 2 the valves 55 are shown as simple cut-off valves, it being understood that a thermal admission valve, later to be described, may be manually set in open position or by-passed by a line having the hand valve 55 as shown in Fig. 3. Anti-freeze lines (not shown) are arranged to be cut in with one group, these pipes, however, being for the protection of water pipes, tanks and other facilities of the car and not particularly for space heating as is the system of the present invention.

Means are provided for admitting steam to the pipes 32, 33 when the weather is sufficiently cold to require heat, say at and below 70° F., and for this purpose an outside thermostat 57 and a thermostat controlled valve 58 are provided for each group of pipes taking off from the train steam line. For clarity the thermostats are shown completely outside the car but in practice they will be placed just inside the outer skin sheet with insulation from the inside heat. Inside temperature instead of outside temperature might be used to control the sidewall heat inasmuch as the heating air is controlled by outside temperature in a manner to be described later; or the admission of steam for sidewall heating could be left to the attention of the train crew, using hand admission valves 55. The specific control used may employ a steam valve having a solenoid controlled by a pressure responsive device which is in turn controlled by fluid in a capillary tube from the thermostat. This system is well known. The secondary heating pipe 33 for each end of the car is controlled by an inside thermostat 57' and a valve 58', the thermostat being set for an above-freezing temperature, say 50° F. or such other temperature as desired and the secondary heat normally being used only for very low temperature conditions or for stand-by heat, a locker switch being available to the train attendant for controlling the use of the secondary heat.

Heated air is supplied by an overhead conduit or duct 60 and branch ducts 61 from a plenum space 62 at one end of the car, a blower 63 taking fresh air from roof side openings 64 (the fresh air being mixed with return air from the car, if desired) and forcing it through the ducts. A heating radiator 65 and a cooling radiator 66 in the plenum space control the temperature of the air supplied to the ducts. The heating radiator 65 is preferably heated by steam from the train steam line 46, the steam being supplied by a branch pipe 67 having the same equipment as the branch lines 45 for the sidewall heating pipes, this equipment including a strainer 50, a shut-off and drain valve 51, a pressure regulator 52, a pressure relief valve 53, steam trap 54, hand valve 55, and a valve 58 controlled by an outside thermostat 57. The thermostat is also shown to be connected to a switch to start the motor of the blower 63.

The supply of steam to the heating radiator 65 may be further regulated by a valve 70 which is subject to joint regulation by an outside thermostat 71 and a main duct thermostat 72. By this arrangement the air temperature is increased as the outside air temperature decreases.

The cooling radiator 66 may be served by similar controls but that is not a part of the present system.

The means provided for regulating the flow of air from the branch ducts 61 includes a valve device in the form of a shutter 75 controlled by a hand operator 76 through suitable connections 77, such for example as a bendable push-pull rod in a bendable tube. The hand operator may be placed at any suitable location in the compartment. The shutter is arranged to cut down the supply of air to the Anemostat 78, which is arranged at the end of each branch air duct, from full flow to about 25% flow. It is not desirable to permit all air flow to the compartment to be cut off.

In operation, steam is admitted to the primary sidewall heating pipes when the outside temperature (or the inside temperature, if that is the arrangement) drops to a given critical predetermined temperature, say 70° F. and remains on for all lower temperatures. At very low temperatures the secondary sidewall heat may be used. For stand-by or lay-over conditions when the overhead heating means is inactive it is advantageous to have the secondary sidewall heat because it prevents the service water pipes from freezing without requiring the use of electrical devices having heavy power consumption. It also insures that the secondary pipe will maintain some heat in the car while it is in service (as for low temperatures or emergency) as long as steam is available, even if the heat from the primary sidewall heating pipe and from the overhead air should be almost completely cut off. This will, as a possible example, furnish a low minimum comfort temperature of, say 63° F., down to about 0° F. or below, outside temperature.

Normally the overhead air will be supplied in full amount and at a low comfort temperature. For example, at 70° F. outside air temperature, the overhead air may be delivered to the main duct at about 60° F. (some cooling) and will be heated progressively as outside temperatures drop until at about 0° F. outside ambient the duct air will be delivered at about 75° F.

If the compartment is not warm enough to suit the occupant he may quickly raise the temperature by starting the blower to blow air through the enclosure over the longitudinal fins of the primary heating pipe. The more the speed of the blower is increased, as by a motor control rheostat (not shown) the greater the amount of hot air that will be circulated by the blower.

At normal compartment temperature ranges the overhead air is at a slightly lower temperature and by operating the damper to reduce the air supply, the compartment temperature is raised slightly. It is raised further, of course, by reheating compartment air with operation of the blower.

During stand-by the overhead air supply will not be used and, if desired, the secondary sidewall heat may be set to come on at a lower temperature than normally, say at 50° F. inside or such other temperature as may be desired.

It is thus seen that the invention provides a very simple, convenient and dependable system for heating enclosures and that it is especially suitable for railway car use. It provides dependable heat for basic comfort conditions and gives the occupant convenient and immediate effective means for raising or lowering the temperature of his compartment at will. The system is readily adapted to be used for converting existing systems to the improved arrangement.

While one embodiment of the invention has been described to illustrate the principles of the invention it is to be understood that there may be various embodiments within the general scope of the invention.

What is claimed is:

1. Heating apparatus for an enclosed structure having a plurality of compartments, comprising in combination, a secondary or standby heating pipe extending along and serving a plurality of compartments continuously while heating is required, a primary heating pipe extending along the same compartments parallel to the secondary heating pipe, a separate tubular heat-insulating enclosure for said primary heating pipe in each compartment, said enclosure having longitudinally spaced inlet and outlet openings, and means at one of said openings for forcing air to circulate from said compartment through said enclosure over the heating pipe therein and to return to the compartment.

2. Heating apparatus for an enclosed structure having a plurality of compartments, comprising in combination, a secondary or standby heating pipe extending along and serving a plurality of compartments continuously while heating is required, said secondary pipe having transverse fins and arranged for limited circulation of compartment air thereover by vertical convection throughout its length in the compartment, a primary heating pipe extending along the same compartments parallel to the secondary heating pipe, a separate tubular heat-insulating enclosure for said primary heating pipe in each compartment, said enclosure having longitudinally spaced inlet and outlet openings, said primary pipe within each enclosure having longitudinal fins, and a blower located at one of said openings for circulating air from said compartment through said enclosure over the heating pipe therein and returning the air to the compartment.

3. Heating apparatus as set forth in claim 2, further characterized by the fact that the primary heating pipe and its enclosure are located above the secondary heating pipe, that said secondary heating pipe is located above the compartment floor, and that a grilled guard is provided over said secondary heating pipe to cover it and furnish a limited circulation of compartment air thereover.

4. Heating apparatus as set forth in claim 2, further characterized by the fact that a passenger seat is provided in a compartment alongside the heating pipes and that the inlet opening and blower are located behind the seat and the outlet opening is located in front of the seat.

5. Heating apparatus for an enclosed structure having a plurality of occupant accommodations on each side, a primary heating pipe and a secondary heating pipe on each side of the structure arranged in parallel along a side of said accommodations, common supply means for the primary heating pipe on one side and the secondary heating pipe on the other side, and means associated with the primary heating pipe on each side for each of a plurality of occupant accommodations for forcibly circulating air thereover.

6. Heating apparatus for an enclosed structure or compartment, comprising in combination, a secondary or standby convection heating pipe extending along and serving an outer sidewall of the enclosed structure or room, control means subject to outside temperature response for supplying heat to said secondary heating pipe at all times when heat is required for the enclosed structure, a primary heating pipe extending along the outer sidewall parallel to the secondary heating pipe, control means subject to outside temperature response for supplying heat to said primary heating pipe at all times when heat is required for the enclosed structure, a heat-insulating enclosure for said primary heating pipe which normally retards its heating effect on the enclosed compartment space, spaced openings in said heat-insulating enclosure, air circulating means for forcing air over the primary heating pipe and into the compartment enclosure at times when desired, a separate ventilating air supply means for the compartment enclosure, and means for heating the ventilating air in response to temperature requirements of the compartment enclosure.

7. Heating apparatus as set forth in claim 6, further characterized by the fact that the enclosed structure is sub-divided into a plurality of sub-compartments, said secondary heating pipe collectively serving a plurality of sub-compartments, said primary heating pipe having a separate heat-insulating enclosure and air circulating means for each sub-compartment, and which further includes means in each sub-compartment for selectively varying the heating effects of the ventilating air.

EDWIN L. KESSLER.

References Cited in the file of this patent

UNITED STATES PATENTS

| Number | Name | Date |
|---|---|---|
| D. 151,022 | Weber | Sept. 14, 1948 |
| 1,558,848 | Doble | Oct. 27, 1925 |
| 1,650,804 | Pritchard | Nov. 29, 1927 |
| 2,044,733 | Mussey | June 16, 1936 |
| 2,323,236 | Parks | June 29, 1943 |
| 2,483,995 | Dean | Oct. 4, 1949 |
| 2,522,285 | Lehane | Sept. 12, 1950 |